April 5, 1960
C. B. BECHTEL
2,931,975
FAULT LOCATION IN ELECTRICAL CABLES
Filed June 26, 1957
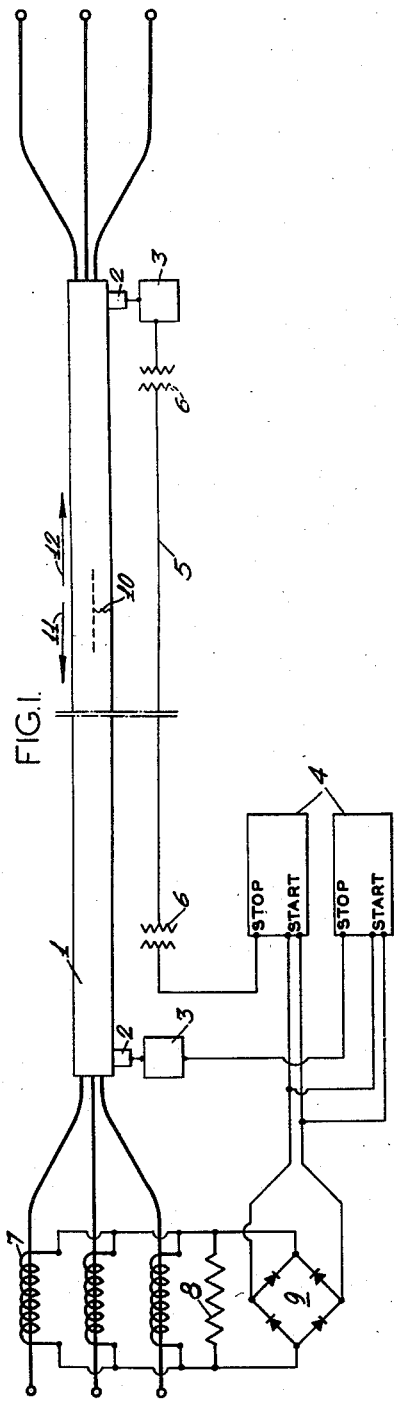
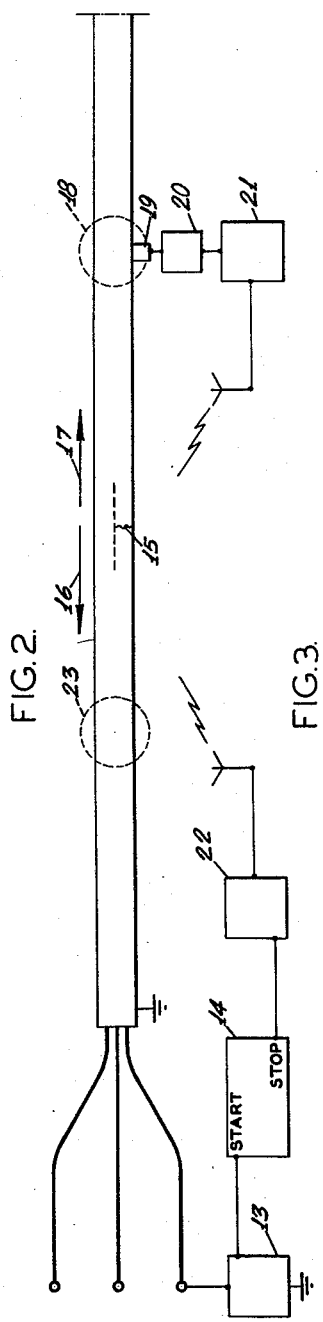
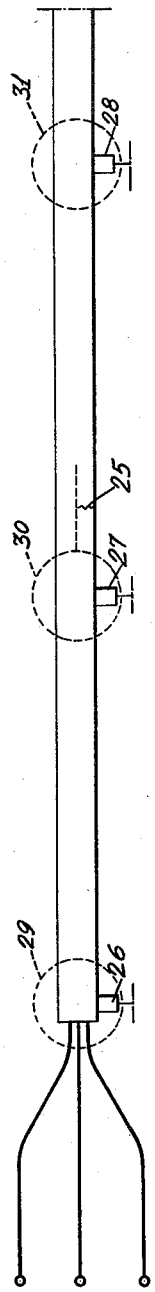
INVENTOR:
CHARLES B. BECHTEL
BY Howson & Howson
ATTYS.

2,931,975

FAULT LOCATION IN ELECTRICAL CABLES

Charles B. Bechtel, Pikesville, Md.

Application June 26, 1957, Serial No. 668,161

15 Claims. (Cl. 324—52)

This application is a continuation-in-part of United States patent application Serial No. 614,969, filed October 9, 1956, and now abandoned.

This invention relates to the location of faults such as short circuits or grounds in current carrying cables. It is particularly adapted to such cables carrying a plurality of insulated metallic sheathed wires in a steel pipe carrying insulating oil or inert gas under pressure. The steel pipe is laid under streets, rivers, bridges and in the ground in open country, and is normally insulated on the outside for electrolytic protection. Such insulated cables, called "pipe type cables," are used in lengths up to 10 miles and carry currents as high as 800 amperes at voltages to ground as great as 130,000 volts. Although these circuits are buried for the majority of their length, the steel pipe is accessible in manholes spaced along the route. The distance between manholes may be as great as one mile.

The location of faults or failures in pipe type cables has proved difficult. Terminal measurement methods used today such as the Wheatstone bridge, the pulse echo, and others, have been successful in locating a fault with an accuracy of approximately one-half percent of the cable length at best and with a cable five miles long, which is typical for pipe cables, this represents a location accuracy of plus or minus 125 feet. It is very costly in both time and excavation expense to pin-point a fault on the basis of such general information. Faults occurring in oil-filled pipe cable systems also have a good possibility of healing themselves as a result of the washing and healing action of the oil. To locate a fault that has healed, the circuit must be re-energized to re-establish the fault. This is a dangerous procedure because of the possibility of circuit breaker failure and the likelihood of burning a hole through the pipe wall. If the latter should happen thousands of gallons of oil can be lost and there exists a possibility of water entering the cable, requiring its partial replacement.

The object of this invention is to provide a means of locating pipe cable faults that will reliably predict a fault location with an accuracy of better than plus or minus six feet regardless of the circuit length. The invention can be applied in at least two ways. First, a pipe cable circuit can be equipped with permanently installed fault locating devices which will automatically record data locating the fault at the instant the fault occurs. Second, this principle can be used to locate faults with portable equipment that can be applied after a circuit failure occurs.

The invention utilizes the fact that compressional wave vibrations that are created by, or may be created at a fault travel away from the fault in the oil, or gas and the steel pipe towards the circuit terminals. The speeds at which these waves travel varies from approximately 1,100 feet per second in gas to approximately 17,000 feet per second in steel. According to this invention, to obtain a fault location it is only necessary to measure the time intervals between the creation of the compressional wave at the fault and the arrival of the waves at at least one observation point along the line. Preferably, two points along the line, separated by a known or measurable distance, are employed as observation points, however. The wave carrying media can be either gas or oil within the pipe, or the pipe steel. The observation point or points to which the time of wave travel is measured can be either the circuit terminals or any two intermediate points along the circuit between which points the fault exists.

In accordance with the method of the present invention, it is possible to locate a fault in an electrical cable having its conductors covered with a protective medium capable of carrying compressional waves when access is available to at least one observation point. An electrical signal is used to generate a compressional wave in the protective medium at the fault. Since the time required for the electrical signal to reach the fault is infinitesimal compared with the time transmission of the compressional wave, timing may begin at the time the electrical signal is initiated and terminated at the time the compressional signal is received at the observation point. This time of wave travel is proportional to the distance between the observation point and the fault.

It is possible according to the invention to employ wave travel time measurement to accurately locate the fault. For example, at any point along the line at which the faulted conductor is accessible an electrical signal may be applied to generate a compressional wave at the fault, which can be in only one direction from the observation point. It is possible to calibrate the timer in terms of distance and read this information directly, but calibration will differ with different cables and with variations in the compressional wave transmission properties of any one cable. If two observation points are selected, however, the process is somewhat simplified, since by use of a simple ratio of the times of compressional wave travel to the respective observation points, the location of the fault may be computed without resort to reliance upon the wave transmission properties of the cable, which may vary from time to time.

The various advantages of the fault locator of this invention will be apparent from the following description and the accompanying drawings forming a part hereof and in which:

Figure 1 illustrates diagrammatically apparatus in a permanent installation on a cable in a circuit;

Figure 2 illustrates diagrammatically apparatus useful with portable equipment on a cable; and Figure 3 illustrates diagrammatically the method of the invention where portable equipment is used and no indication of the possible fault location is available.

In the drawings similar numerals refer to similar parts in the several views.

A permanent installation of fault locating equipment embodying the principles proposed in this invention is shown in Figure 1. A three phase paper-insulated metal-wrapped cable in a steel pipe under an oil or gas pressure of 200 pounds per square inch is illustrated at 1. At each end of the circuit at an observation point is permanently installed a transducer 2 which converts automatically compression wave vibrations in the oil, gas or steel pipe, with whichever medium the transducer is associated, into an electric timer stopping signal. If it is desired to have a multiple check, transducers responsive to waves in different media may be used in any one location. The transducers are connected to cathode follower and decade amplifiers 3 which amplify the electrical signals developed by the transducers when excited by compressional wave vibrations arriving from the fault. The amplified signals are fed into the stop channels of interval timers 4 which are permanently installed at one terminal of the circuit.

The stop pulse from the transducer and amplifier combination installed at the terminal remote from the interval timers is fed back to its timer over a telephone line or control cable 5 by use of impedance matching transformers 6.

Current transformers 7 are installed on the circuit conductors at the terminal at which the interval timers are located. For normal operating conditions, the currents in each conductor are equal and 120 degrees out of phase. The current transformers, by virtue of their parallel connection, develop no voltage from this condition of balanced current. When a fault occurs, the current in the faulted conductor rises to many times its normal value, and a substantial voltage is developed across the current transformer connections. The value of this voltage is limited by a loading resistor 8, the value of which is chosen to provide 30 volts drop with a minimum expected fault current. The output voltage across this resistor is fed into a standard dry type bridge rectifier 9 having a voltage rating greater than the expected voltage developed across the load resistor under conditions of maximum fault current flow. The polarity of this rectifier is chosen to match the polarity of the start channel of the time interval meters so that the first rise of fault current, whether positive or negative, will instantly start the time interval meters.

Again referring to Figure 1, the overall operation of this permanently installed fault locating equipment is described as follows: When an insulation failure to ground, a fault, occurs at 10, compressional wave vibrations are created in the oil, or gas, and steel pipe by the fault energy which travels in both directions 11 and 12 from the fault. At the instant the fault occurs, the interval timers 4 are simultaneously triggered by the current transformer—bridge rectifier starting circuit and commence to record elapsed time. The timers are individually stopped by the arrival of the pressure waves at the circuit terminals as detected by the transducers 2 and coupled to the timers by the amplifiers 3 and control cable link 5. The timers digitally record time in units of .0001 second and hold their readings until reset.

Location of the fault is accomplished by use of one of several possible proportions, one of which will be illustrated. Here we consider two observation points along a faulted pipe cable circuit, one on each side of the fault. Let L be the distance in feet between these points, and let $T_1$ be the time between the occurrence of a compressional wave vibration at the fault and the arrival of this wave at point 1. Let $T_2$ be a similarly derived transit time for the wave arriving at point 2. Since the transit time of a wave traveling between two points is directly proportional to the distance between the points, it is apparent that L is proportional to $T_1+T_2$. And if X is defined as the distance from point 1 to the fault, source of the waves, it is also apparent that X is proportional to $T_1$. The distance from point 1 to the fault is then simply obtained from the expression $$\frac{X}{L}=\frac{T_1}{T_1+T_2}$$

It should be noted that the expression giving the fault location does not contain terms involving the speed of sound waves in the transmission medium, and errors resulting from variations of this speed with pressure and temperature are therefore eliminated. Using this formula, fault location has proven accurate to within ± six feet regardless of circuit length.

Using this apparatus and method, the location is available within a matter of seconds after the circuit fails. With such a permanent installation, the vagaries of self-healing faults and the possibility of having to re-energize the circuit, are eliminated.

A method and apparatus by which the principles of this invention can be applied to locate pipe cable faults with portable, rather than permanently installed equipment, is shown in Figure 2. The fault can be located between closely spaced points, like manholes, either by conventional means such as a high voltage bridge or by entering manholes and audibly detecting intensity of vibration caused by an impulse generator 13 applied to the faulted conductor at a circuit terminal. When this generator discharges, it starts an interval timer 14 and effectively simultaneously creates a compressional wave vibration in the pipe steel at the fault 15. This wave vibration travels in the pipe steel in opposite directions 16 and 17 from the fault. Apparatus associated with the pick-up transducer is placed in one of the manholes, such as manhole 18. When the wave arrives at a manhole 18, it is converted into an electrical signal by a transducer 19 coupled to the steel pipe. This signal is fed to an amplifier 20 which in turn modulates the carrier of a typical radio-telephone transmitter 21 used for mobile communications by utilities. The signal of the transmitter is received at the circuit terminal by a second mobile radio 22, the receiver output of which is coupled to the stop channel of the timer. A sequence of time interval measurements is made in this manner, one measurement made for each discharge of the impulse generator, until a consistent and repetitive set of time readings is obtained. The time interval thus obtained is proportional to the distance from the manhole to the fault. The transducer, amplifier and radio-telephone equipped vehicle are then moved to another manhole such as manhole 23, where a similar procedure is followed. If enough is known about the fault to know it lies between the two manholes from which tests are made, the two time readings thus established, when applied to a time-ratio formula previously developed, accurately locate the fault with respect to these manholes, the distance between which is known or measurable. Rough location of the fault may be accomplished by other known means or calculations may be made using known transmission properties of the compressional wave transmitting media. If manholes straddling the fault are not conveniently available, measurement may be made from two manholes on one side of the fault. In such case, the formula developed above will be modified to read $$\frac{X}{L}=\frac{T_1}{T_2-T_1}$$

wherein $T_1$ represents the smaller of the time measurements, obviously made in the manhole nearest the fault. $T_2$ represents the larger of the time measurements, obviously made in the manhole farthest from the fault. X represents the distance from the nearest manhole to the fault, and L represents the distance between manholes.

Figure 3 illustrates that location of a fault can be made without approximate knowledge of the location of the fault using three observation points. Two of these will be on the same side of a fault 25 and the third may be too. Here the transducers 26, 27 and 28, which in the case of portable equipment are one and the same transducer used successively in each of the manholes 29, 30 and 31, act exactly the same way as do the transducers in the systems of Figs. 1 and 2. Since the assumption here is that the location of the fault is not even approximately known, i.e., it is not known to lie between any pair of manholes, the time measurments for two pairs are introduced into the formula $$\frac{X}{L}=\frac{T_1}{T_2+T_1}$$

and solved for both the possible answers. There will be one location common to the solutions for both pairs and that will be the correct position.

It will be clear that there are a great many variations to the present invention. The equipment and techniques above described may be recombined to include a variety of apparatus and methods, and these, in turn, as well as those described may be embodied with other apparatus and methods, all within the scope of the claims.

I claim:
1. The method of determining the location of a fault in an electrical cable having its conductors covered with a protective medium capable of carrying compressional waves comprising generating in the protective medium a compressional wave at the fault, measuring the time required for the compressional wave to reach an observation point, and computing from said time the distance of said fault from a point of measurement.

2. The method of determining the location of a fault in an electrical cable having its conductors covered with a protective medium capable of carrying compressional waves comprising starting a timer simultaneously with generation of a compressional wave at the fault, detecting the arrival of the compressional wave at an observation point, stopping the timer at said time of arrival, and computing from said time the distance of said fault from a point of measurement.

3. The method of claim 1 in which a single measurement is made so that the location of the fault may be calculated from known properties of transmission in the compressional medium.

4. The method of claim 1 in which time measurements are made from at least two separate observation points so that the distance to the fault from one observation point may be computed from a proportion of compressional wave travel times equated to a proportion of known distance between the observation points and the unknown distance to the fault without knowledge of the physical properties of the cable.

5. The method of claim 4 in which time measurements are made from observation points known to be on opposite sides of the fault.

6. The method of claim 4 in which time measurements are made from observation points known to be on one side of the fault.

7. The method of claim 4 in which time measurements are made from at least three separate observation points where the approximate location of the fault is not known, separate computations for at least two pairs of points are made assuming alternatively the fault to be between and outside the observation points and comparison is made to determine the true fault which will be at the common point of common solution for the two pairs of observation points.

8. A fault locator for electrical cable in which the circuit conductors are covered with a compressional wave carrying protective medium comprising means for timing the time required for the compressional wave to travel in the protective medium from the fault to a selected observation point, means for starting the timing effectively at the time when the compressional wave is impressed on the protective medium at the fault, and means for detecting the arrival of the compressional wave at the observation point and producing a signal to stop the timing means.

9. The fault locator of claim 8 in which the means for starting the timing is an impulse generator which also initiates the signal which produces the compressional wave.

10. The fault locator of claim 9 in which a radio link including a transmitter and receiver is included between the means for detecting the arrival of the compressional wave and the timer which is located proximate to the impulse generator.

11. The fault locator of claim 8 in which a pair of timing means is employed, each timer being adapted to be started at the same time by the same means and separate means for detecting the arrival of the compressional wave at different observation points and producing separate signals each stopping a different timing means.

12. The fault locator of claim 11 in which the means for starting the timing includes a detection means which immediately detects the occurrence of a fault by conditions that occur and the means for detecting the arrival of compressional waves are adapted to be permanently installed at their observation points and connected to the timing means.

13. A system for location of faults in electrical cable having its conductors covered with a compressional wave carrying protective medium comprising the cable, means coupled to the cable at fixed observation points for detecting compressional waves generated at a fault and producing a signal, timing means for each detecting means coupled to said detecting means so that a signal from the detecting means will stop the timer, a fault sensing means for detecting when a fault occurs and producing a signal and means coupling the fault sensing means to each of the timers so that they will be simultaneously started upon the occurrence of a fault.

14. A system for location of faults in electrical cable having its conductors covered with a compressional wave carrying protective medium comprising an impulse generator adapted to be connected to a cable conductor to produce a signal which will generate a compressional wave at the fault, at least one detecting means for use at a selected observation point to detect compressional waves generated at the fault and producing a signal in response thereto, a timer for each detection means having starting means adapted to be started by a signal from the impulse generator and stopped by a signal from its detection means, coupling means coupling each of the timers to the impulse generator such that a signal simultaneous with the impulse from the generator will start the timer and coupling means coupling each detection means to its timer so that the signal produced by a compressional wave will stop the timer.

15. The system of claim 14 in which the coupling between the detection means and the timer includes a radio link with the transmitter coupled to the detection means and the receiver coupled to the timer.

References Cited in the file of this patent
UNITED STATES PATENTS
2,725,526    Stringfield _____ Nov. 29, 1955

FOREIGN PATENTS
1,021,096    France _____ Feb. 13, 1953

OTHER REFERENCES
Publication, Bechtel: Electrical World, Feb. 21, 1955, pp. 114, 187–188.

UNITED STATES PATENT OFFICE

CERTIFICATE OF CORRECTION

Patent No. 2,931,975                                April 5, 1960

Charles B. Bechtel

It is hereby certified that error appears in the printed specification of the above numbered patent requiring correction and that the said Letters Patent should read as corrected below.

Column 4, lines 64 to 66, the formula should appear as shown below instead of as in the patent:

$$\frac{X}{L} = \frac{T_1}{T_2 \pm T_1}$$

Signed and sealed this 6th day of September 1960.

(SEAL)

Attest:
ERNEST W. SWIDER                              ROBERT C. WATSON

Attesting Officer                                    Commissioner of Patents